(12) United States Patent
Lee

(10) Patent No.: US 12,481,272 B2
(45) Date of Patent: Nov. 25, 2025

(54) EQUIPMENT SCHEDULE CONTROL METHOD AND APPARATUS

(71) Applicant: SEMES CO., LTD., Cheonan-si (KR)

(72) Inventor: Jongseok Lee, Hwaseong-si (KR)

(73) Assignee: SEMES CO., LTD., Chungcheongnam-do (KR)

( * ) Notice: Subject to any disclaimer, the term of this patent is extended or adjusted under 35 U.S.C. 154(b) by 301 days.

(21) Appl. No.: 18/326,873

(22) Filed: May 31, 2023

(65) Prior Publication Data

US 2024/0004359 A1    Jan. 4, 2024

(30) Foreign Application Priority Data

Jul. 1, 2022    (KR) ........................ 10-2022-0081046

(51) Int. Cl.
*G05B 19/418*   (2006.01)
*B25J 9/16*     (2006.01)
*G05B 15/02*    (2006.01)

(52) U.S. Cl.
CPC ...... *G05B 19/41865* (2013.01); *B25J 9/1602* (2013.01); *B25J 9/1605* (2013.01);
(Continued)

(58) Field of Classification Search
CPC .............. G05B 15/02; G05B 19/41835; G05B 19/41865; G05B 19/41885; B25J 9/1602; B25J 9/1605
See application file for complete search history.

(56) References Cited

U.S. PATENT DOCUMENTS 10,466,686 B2 *  11/2019  Moorhouse ...... G05B 19/41865
11,308,453 B2     4/2022  Cui

FOREIGN PATENT DOCUMENTS

CN    114428487 A  *  5/2022  ......... G05B 19/4185
CN    115456499 A  *  12/2022  ............. B65G 43/08
(Continued)

OTHER PUBLICATIONS

Office Action dated Jul. 12, 2024, for the corresponding Korean Patent Application No. 10-2022-0081046.

*Primary Examiner* — Crystal J Barnes-Bullock
(74) *Attorney, Agent, or Firm* — Muir Patent Law, PLLC

(57) ABSTRACT

Disclosed is an equipment schedule control method and apparatus capable of operating equipment according to an optimal schedule in various environments by virtually simulating operation of the equipment, the method including (a) receiving parameter information related to operation of the equipment from an equipment terminal or an operator terminal, (b) generating primary simulation model information to which operation of current equipment is reflected, by using the parameter information, (c) reconstructing virtually operable secondary simulation model information by using the primary simulation model information, (d) calculating and comparing primary scheduling result information of the primary simulation model information and secondary scheduling result information of the secondary simulation model information, and (e) transmitting optimal equipment control information to the equipment terminal or the operator terminal to control the equipment to follow the secondary simulation model information, when the secondary scheduling result information is superior to the primary scheduling result information.

20 Claims, 12 Drawing Sheets

(52) U.S. Cl.
CPC ....... *G05B 15/02* (2013.01); *G05B 19/41835* (2013.01); *G05B 19/41885* (2013.01)

(56) References Cited

FOREIGN PATENT DOCUMENTS

| | | | | |
|---|---|---|---|---|
| CN | 116760122 | A * | 9/2023 | ............. H02J 3/466 |
| CN | 113837660 | B * | 8/2024 | ............. G06N 3/045 |
| CN | 113112145 | B * | 7/2025 | ............. G06Q 50/04 |
| JP | H0750332 | A | 2/1995 | |
| JP | 2013049500 | A | 3/2013 | |
| JP | 2017062297 | A | 3/2017 | |
| JP | 6825686 | B1 * | 2/2021 | ......... G05B 19/4185 |
| JP | 2024517150 | A * | 4/2024 | ........... G06Q 10/063 |
| KR | 1020080003633 | A | 1/2008 | |
| KR | 100957401 | B1 | 5/2010 | |
| KR | 1020180005843 | A | 1/2018 | |
| KR | 102041512 | B1 | 11/2019 | |
| WO | WO-2017061021 | A1 * | 4/2017 | ........... G05B 19/418 |
| WO | WO-2021103947 | A1 * | 6/2021 | ............ G06N 3/045 |

\* cited by examiner

FIG. 11

Self-Test Sheet

| No | | | PARAMETER | | RESULT |
|---|---|---|---|---|---|
| 1 | LP1 LP2 LP3 | Job 1 Job 2 Job 3 | Name | 01 | |
| 2 | LP1 LP2 LP3 | Job 1 Job 2 Job 3 | Name | 10 | |
| 3 | | Job 1 | | 20 | |
| 4 | | Job 1 | | 30 | |

EQUIPMENT SCHEDULE CONTROL METHOD AND APPARATUS

CROSS-REFERENCE TO RELATED PATENT APPLICATION

This application claims the benefit of Korean Patent Application No. 10-2022-0081046, filed on Jul. 1, 2022, in the Korean Intellectual Property Office, the disclosure of which is incorporated herein in its entirety by reference.

BACKGROUND OF THE INVENTION

1. Field of the Invention

The present invention relates to an equipment schedule control method and apparatus and, more particularly, to an equipment schedule control method and apparatus capable of operating equipment according to an optimal schedule in various environments by virtually simulating operation of the equipment.

2. Description of the Related Art

Generally, in existing semiconductor equipment, robots may transfer a wafer by checking the arrival of the wafer and a path along which the wafer may move.

In this case, because a transfer logic uses a fixed logic which is initially set for installation, when a job environment is changed or a hardware environment, e.g., robots, is changed, an operator needs to stop the equipment, manually calculate appropriateness one by one and, when necessary, design and re-apply a new logic to the equipment instead of the already used fixed logic.

SUMMARY OF THE INVENTION

The present invention provides an equipment schedule control method and apparatus capable of controlling equipment according to an optimal operation sequence based on a simulation result obtained by constructing a virtual simulation model through real-time monitoring of the equipment and repeatedly reconstructing an operation sequence by using the virtual simulation model. However, the above description is merely an example, and the scope of the present invention is not limited thereto.

According to an aspect of the present invention, there is provided an equipment schedule control method using a computer system including a server computer connected to at least one equipment terminal and at least one operator terminal through a network, wherein the server computer includes a parameter information input program for receiving parameter information related to operation of equipment from the equipment terminal or the operator terminal, a primary simulation model generation program for generating primary simulation model information to which operation of current equipment is reflected, by using the parameter information, a secondary simulation model reconstruction program for reconstructing virtually operable secondary simulation model information by using the primary simulation model information, a simulation result comparison program for calculating and comparing primary scheduling result information of the primary simulation model information and secondary scheduling result information of the secondary simulation model information, an optimal equipment control program for transmitting optimal equipment control information to the equipment terminal or the operator terminal to control the equipment to follow the secondary simulation model information, when the secondary scheduling result information is superior to the primary scheduling result information, a parameter information database for storing the parameter information, a primary simulation model information database for storing the primary simulation model information, a secondary simulation model information database for storing the secondary simulation model information, a primary scheduling result information database for storing the primary scheduling result information, a secondary scheduling result information database for storing the secondary scheduling result information, and an optimal equipment control information database for storing the optimal equipment control information, and wherein the equipment schedule control method includes (a) by the parameter information input program, receiving the parameter information related to the operation of the equipment from the equipment terminal or the operator terminal, (b) by the primary simulation model generation program, generating the primary simulation model information to which the operation of the current equipment is reflected, by using the parameter information, (c) by the secondary simulation model reconstruction program, reconstructing the virtually operable secondary simulation model information by using the primary simulation model information, (d) by the simulation result comparison program, calculating and comparing the primary scheduling result information of the primary simulation model information and the secondary scheduling result information of the secondary simulation model information, and (e) by the optimal equipment control program, transmitting the optimal equipment control information to the equipment terminal or the operator terminal to control the equipment to follow the secondary simulation model information, when the secondary scheduling result information is superior to the primary scheduling result information.

The equipment may include semiconductor equipment including at least one selected from among an equipment front end module, a loader module, an unloader module, an index module, a loadlock module, a transfer module, a process module, a loader robot, an unloader robot, a transfer robot, a gate valve, and combinations thereof.

The parameter information may include at least one of module information, robot information, process information, operation information, action definition information, operation performability information, substrate location information, hardware operation time information, job operation time information, update information, change information, substrate information, current schedule information, environment information, sensing information, operator input information, operator command information, current action information, wafer location information, productivity information, and combinations thereof.

The primary simulation model information may include at least one of loadlock module supply information, loadlock module return information, transfer module supply information, transfer module return information, process module supply information, process module return information, and combinations thereof, which represent a current operation sequence of the equipment.

The secondary simulation model information may include at least one of loadlock module supply prediction information, loadlock module return prediction information, transfer module supply prediction information, transfer module return prediction information, process module supply prediction information, process module return prediction information, and combinations thereof, which represent available virtual operation sequences.

The primary scheduling result information may include at least one of a substrate processing time of the current equipment, a substrate processing quantity of the current equipment, a substrate yield of the current equipment, productivity of the current equipment, production efficiency of the current equipment, and combinations thereof.

The secondary scheduling result information may include at least one of a substrate processing time of the reconstructed equipment, a substrate processing quantity of the reconstructed equipment, a substrate yield of the reconstructed equipment, productivity of the reconstructed equipment, production efficiency of the reconstructed equipment, and combinations thereof.

The optimal equipment control information may include at least one of loadlock module supply command information, loadlock module return command information, transfer module supply command information, transfer module return command information, process module supply command information, process module return command information, and combinations thereof, which represent an optimal operation sequence to control the equipment to follow the secondary simulation model information.

The secondary simulation model reconstruction program may include an operation sequence definition program for defining an operation sequence of the primary simulation model information, and an operation sequence change program for newly changing the operation sequence of the primary simulation model information, and step (c) may include (c-1) by the operation sequence definition program, defining the operation sequence of the primary simulation model information, and (c-2) by the operation sequence change program, newly changing the operation sequence of the primary simulation model information.

The secondary simulation model reconstruction program may further include an operability verification program for verifying operability by simulating the secondary simulation model information according to the newly changed operation sequence, and step (c) may further include (c-3) by the operability verification program, verifying operability by simulating the secondary simulation model information according to the newly changed operation sequence.

The secondary simulation model reconstruction program may further include a secondary simulation model determination program for ultimately determining the verified secondary simulation model information, and step (c) may further include (c-4) by the secondary simulation model determination program, ultimately determining the verified secondary simulation model information.

The server computer may further include a parameter update program for receiving real-time parameter update information of the equipment from the equipment terminal or the operator terminal to monitor the equipment in real time, and a real-time parameter update information database for storing the real-time parameter update information, and the equipment schedule control method may further include, before step (b), (f) by the parameter update program, receiving the real-time parameter update information of the equipment from the equipment terminal or the operator terminal to monitor the equipment in real time.

The server computer may further include a primary simulation model verification program for verifying whether current equipment operation information measured by the equipment terminal or a separate sensing device matches the primary simulation model information, and an equipment operation information database for storing the equipment operation information, and the equipment schedule control method may further include, before step (c), (g) by the primary simulation model verification program, verifying whether the current equipment operation information measured by the equipment terminal or the separate sensing device matches the primary simulation model information.

The server computer may further include a simulation program for virtually simulating the primary simulation model information or virtually simulating the secondary simulation model information, and the equipment schedule control method may further include, before step (d), (h) by the simulation program, virtually simulating the primary simulation model information or virtually simulating the secondary simulation model information.

The server computer may further include a simulation acceleration program for accelerating the simulation to achieve time synchronization, and the equipment schedule control method may further include, after step (h), (i) by the simulation acceleration program, accelerating the simulation to achieve time synchronization.

According to another aspect of the present invention, there is provided an equipment schedule control apparatus including a parameter information inputter for receiving parameter information related to operation of equipment, a primary simulation model generator for generating primary simulation model information to which operation of current equipment is reflected, by using the parameter information, a secondary simulation model reconstructor for reconstructing virtually operable secondary simulation model information by using the primary simulation model information, a simulation result comparator for calculating and comparing primary scheduling result information of the primary simulation model information and secondary scheduling result information of the secondary simulation model information, and an optimal equipment controller for applying optimal equipment control information to the equipment to control the equipment to follow the secondary simulation model information, when the secondary scheduling result information is superior to the primary scheduling result information.

The equipment may include semiconductor equipment including at least one selected from among an equipment front end module, a loader module, an unloader module, an index module, a loadlock module, a transfer module, a process module, a loader robot, an unloader robot, a transfer robot, a gate valve, and combinations thereof.

The secondary simulation model reconstructor may include an operation sequence definer for defining an operation sequence of the primary simulation model information, an operation sequence changer for newly changing the operation sequence of the primary simulation model information, an operability verifier for verifying operability by simulating the secondary simulation model information according to the newly changed operation sequence, and a secondary simulation model determiner for ultimately determining the verified secondary simulation model information.

The equipment schedule control apparatus may further include a parameter updater for receiving real-time parameter update information of the equipment from an equipment terminal or an operator terminal to monitor the equipment in real time, a simulator for virtually simulating the primary simulation model information or virtually simulating the secondary simulation model information, and a simulation accelerator for accelerating the simulation to achieve time synchronization.

According to another aspect of the present invention, there is provided an equipment schedule control method using a computer system including a server computer connected to at least one equipment terminal and at least one operator terminal through a network, wherein the server computer includes a parameter information input program for receiving parameter information related to operation of equipment from the equipment terminal or the operator terminal, a primary simulation model generation program for generating primary simulation model information to which operation of current equipment is reflected, by using the parameter information, a secondary simulation model reconstruction program for reconstructing virtually operable secondary simulation model information by using the primary simulation model information, a simulation result comparison program for calculating and comparing primary scheduling result information of the primary simulation model information and secondary scheduling result information of the secondary simulation model information, an optimal equipment control program for transmitting optimal equipment control information to the equipment terminal or the operator terminal to control the equipment to follow the secondary simulation model information, when the secondary scheduling result information is superior to the primary scheduling result information, a parameter information database for storing the parameter information, a primary simulation model information database for storing the primary simulation model information, a secondary simulation model information database for storing the secondary simulation model information, a primary scheduling result information database for storing the primary scheduling result information, a secondary scheduling result information database for storing the secondary scheduling result information, and an optimal equipment control information database for storing the optimal equipment control information, wherein the equipment schedule control method includes (a) by the parameter information input program, receiving the parameter information related to the operation of the equipment from the equipment terminal or the operator terminal, (b) by the primary simulation model generation program, generating the primary simulation model information to which the operation of the current equipment is reflected, by using the parameter information, (c) by the secondary simulation model reconstruction program, reconstructing the virtually operable secondary simulation model information by using the primary simulation model information, (d) by the simulation result comparison program, calculating and comparing the primary scheduling result information of the primary simulation model information and the secondary scheduling result information of the secondary simulation model information, and (e) by the optimal equipment control program, transmitting the optimal equipment control information to the equipment terminal or the operator terminal to control the equipment to follow the secondary simulation model information, when the secondary scheduling result information is superior to the primary scheduling result information, wherein the equipment includes semiconductor equipment including at least one selected from among an equipment front end module, a loader module, an unloader module, an index module, a loadlock module, a transfer module, a process module, a loader robot, an unloader robot, a transfer robot, a gate valve, and combinations thereof, wherein the parameter information includes at least one of module information, robot information, process information, operation information, action definition information, operation performability information, substrate location information, hardware operation time information, job operation time information, update information, change information, substrate information, current schedule information, environment information, sensing information, operator input information, operator command information, current action information, wafer location information, productivity information, and combinations thereof, wherein the primary simulation model information includes at least one of loadlock module supply information, loadlock module return information, transfer module supply information, transfer module return information, process module supply information, process module return information, and combinations thereof, which represent a current operation sequence of the equipment, wherein the secondary simulation model information includes at least one of loadlock module supply prediction information, loadlock module return prediction information, transfer module supply prediction information, transfer module return prediction information, process module supply prediction information, process module return prediction information, and combinations thereof, which represent available virtual operation sequences, wherein the primary scheduling result information includes at least one of a substrate processing time of the current equipment, a substrate processing quantity of the current equipment, a substrate yield of the current equipment, productivity of the current equipment, production efficiency of the current equipment, and combinations thereof, wherein the secondary scheduling result information includes at least one of a substrate processing time of the reconstructed equipment, a substrate processing quantity of the reconstructed equipment, a substrate yield of the reconstructed equipment, productivity of the reconstructed equipment, production efficiency of the reconstructed equipment, and combinations thereof, and wherein the optimal equipment control information includes at least one of loadlock module supply command information, loadlock module return command information, transfer module supply command information, transfer module return command information, process module supply command information, process module return command information, and combinations thereof, which represent an optimal operation sequence to control the equipment to follow the secondary simulation model information.

According to another aspect of the present invention, there is provided an equipment schedule control system using a computer system including a server computer connected to at least one equipment terminal and at least one operator terminal through a network, wherein the server computer includes a parameter information input program for receiving parameter information related to operation of equipment from the equipment terminal or the operator terminal, a primary simulation model generation program for generating primary simulation model information to which operation of current equipment is reflected, by using the parameter information, a secondary simulation model reconstruction program for reconstructing virtually operable secondary simulation model information by using the primary simulation model information, a simulation result comparison program for calculating and comparing primary scheduling result information of the primary simulation model information and secondary scheduling result information of the secondary simulation model information, an optimal equipment control program for transmitting optimal equipment control information to the equipment terminal or the operator terminal to control the equipment to follow the secondary simulation model information, when the secondary scheduling result information is superior to the primary scheduling result information, a parameter information database for storing the parameter information, a primary simulation model information database for storing the primary simulation model information, a secondary simulation model information database for storing the secondary simulation model information, a primary scheduling result information database for storing the primary scheduling result information, a secondary scheduling result information database for storing the secondary scheduling result information, an optimal equipment control information database for storing the optimal equipment control information, and a controller programmed to, by the parameter information input program, receive the parameter information related to the operation of the equipment from the equipment terminal or the operator terminal, by the primary simulation model generation program, generate the primary simulation model information to which the operation of the current equipment is reflected, by using the parameter information, by the secondary simulation model reconstruction program, reconstruct the virtually operable secondary simulation model information by using the primary simulation model information, by the simulation result comparison program, calculate and compare the primary scheduling result information of the primary simulation model information and the secondary scheduling result information of the secondary simulation model information and, by the optimal equipment control program, transmit the optimal equipment control information to the equipment terminal or the operator terminal to control the equipment to follow the secondary simulation model information, when the secondary scheduling result information is superior to the primary scheduling result information.

According to another aspect of the present invention, there is provided a computer-readable recording medium having recorded thereon an equipment schedule control method using a computer system including a server computer connected to at least one equipment terminal and at least one operator terminal through a network, wherein the server computer includes a parameter information input program for receiving parameter information related to operation of equipment from the equipment terminal or the operator terminal, a primary simulation model generation program for generating primary simulation model information to which operation of current equipment is reflected, by using the parameter information, a secondary simulation model reconstruction program for reconstructing virtually operable secondary simulation model information by using the primary simulation model information, a simulation result comparison program for calculating and comparing primary scheduling result information of the primary simulation model information and secondary scheduling result information of the secondary simulation model information, an optimal equipment control program for transmitting optimal equipment control information to the equipment terminal or the operator terminal to control the equipment to follow the secondary simulation model information, when the secondary scheduling result information is superior to the primary scheduling result information, a parameter information database for storing the parameter information, a primary simulation model information database for storing the primary simulation model information, a secondary simulation model information database for storing the secondary simulation model information, a primary scheduling result information database for storing the primary scheduling result information, a secondary scheduling result information database for storing the secondary scheduling result information, and an optimal equipment control information database for storing the optimal equipment control information, and wherein the equipment schedule control method includes (a) by the parameter information input program, receiving the parameter information related to the operation of the equipment from the equipment terminal or the operator terminal, (b) by the primary simulation model generation program, generating the primary simulation model information to which the operation of the current equipment is reflected, by using the parameter information, (c) by the secondary simulation model reconstruction program, reconstructing the virtually operable secondary simulation model information by using the primary simulation model information, (d) by the simulation result comparison program, calculating and comparing the primary scheduling result information of the primary simulation model information and the secondary scheduling result information of the secondary simulation model information, and (e) by the optimal equipment control program, transmitting the optimal equipment control information to the equipment terminal or the operator terminal to control the equipment to follow the secondary simulation model information, when the secondary scheduling result information is superior to the primary scheduling result information.

BRIEF DESCRIPTION OF THE DRAWINGS

The above and other features and advantages of the present invention will become more apparent by describing in detail embodiments thereof with reference to the attached drawings in which:

FIG. 11 is a table showing an example of parameters of an equipment schedule control system according to other embodiments of the present invention.

DETAILED DESCRIPTION OF THE INVENTION

Figure 1:
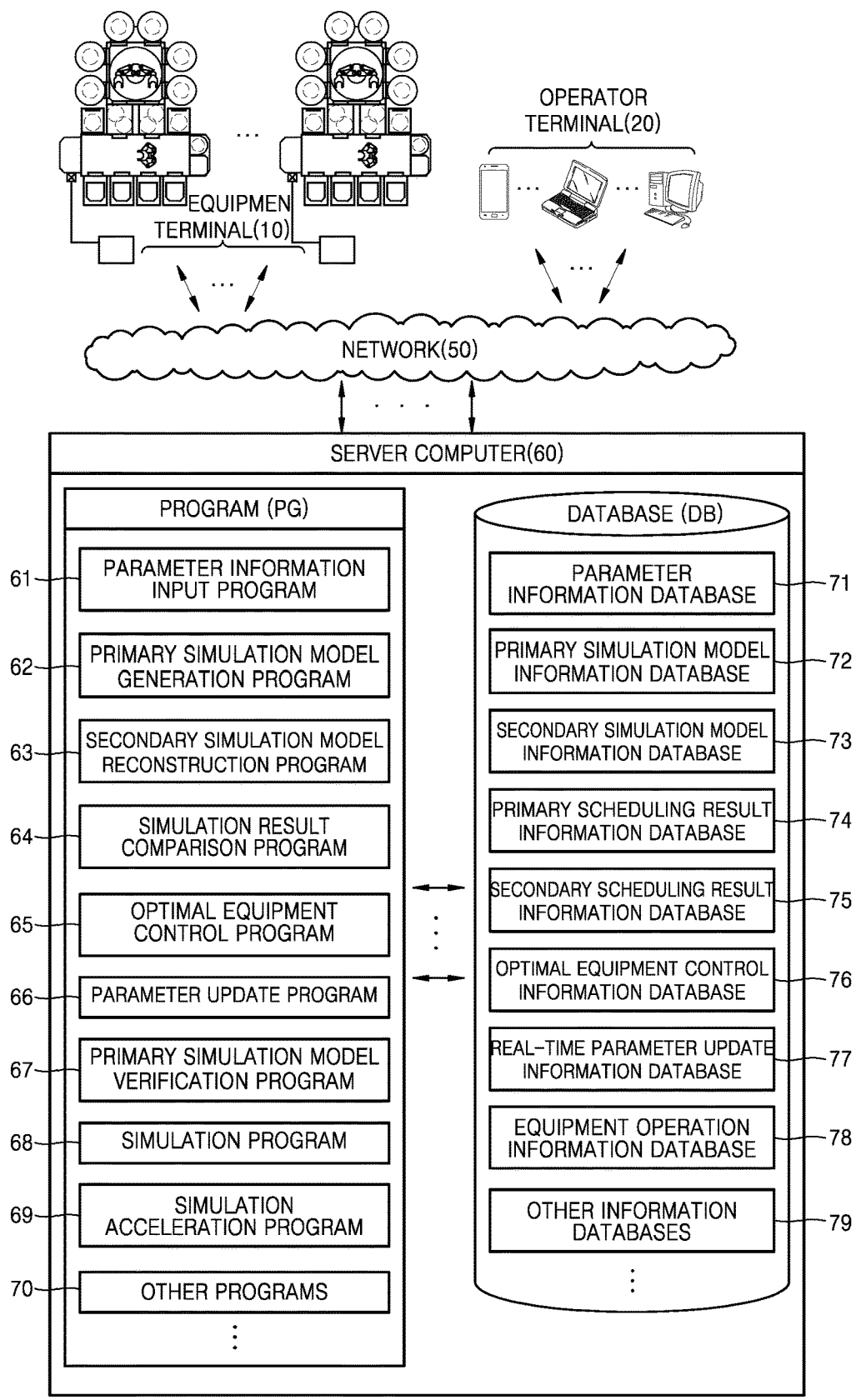
FIG. 1 is a conceptual view of an equipment schedule control system according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein, rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

The terminology used herein is for the purpose of describing particular embodiments and is not intended to limit the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, components, and/or groups thereof, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

An equipment schedule control method and apparatus according to some embodiments of the present invention will now be described with reference to the drawings.

Figure 2:
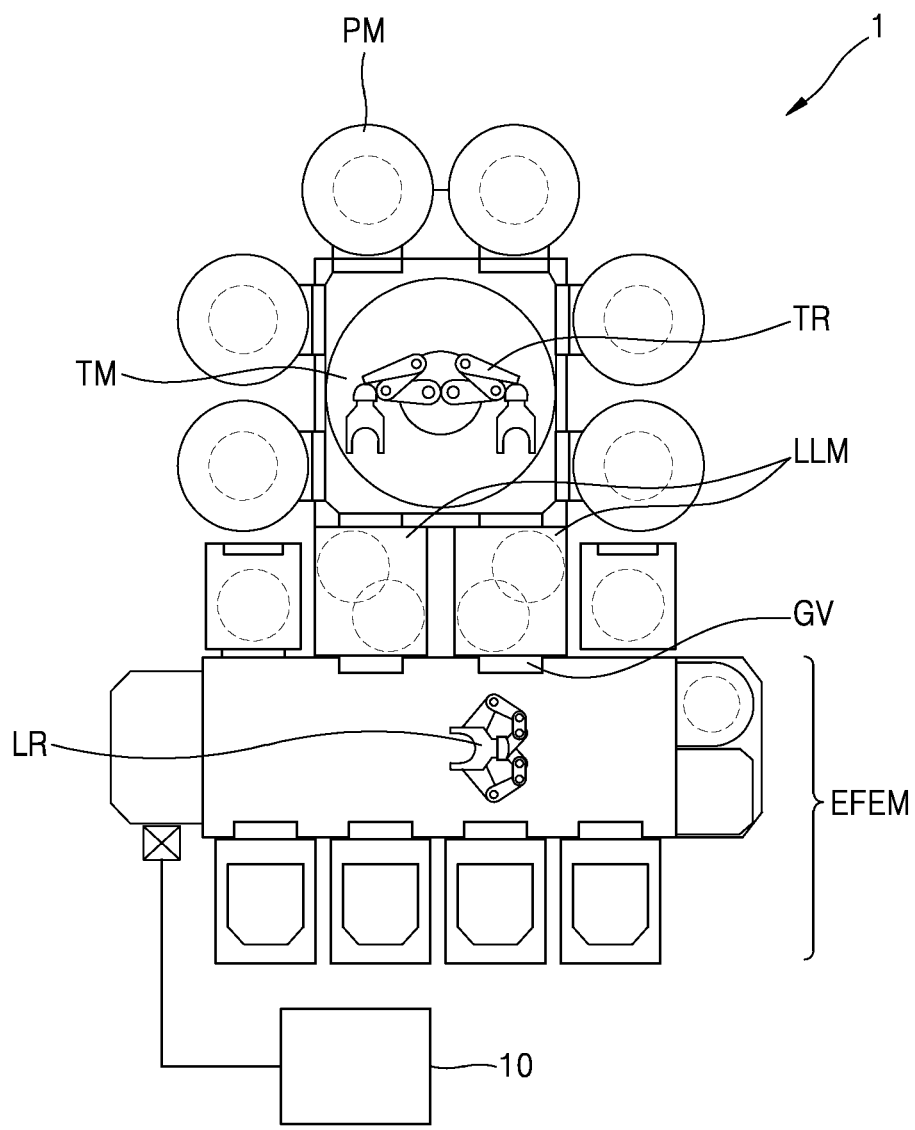
FIG. 2 is a conceptual view of an equipment terminal of the equipment schedule control system of FIG. 1.

FIG. 1 is a conceptual view of an equipment schedule control system according to some embodiments of the present invention, and FIG. 2 is a conceptual view of an equipment terminal 10 of the equipment schedule control system of FIG. 1.

Initially, as shown in FIG. 1, the equipment schedule control system according to some embodiments of the present invention may include a server computer 60 connected to at least one equipment terminal 10 and at least one operator terminal 20 through a network 50.

Herein, in addition to the above-mentioned terminals 10 and 20, the network 50 may be connected to an internet of things (IoT) or another electronic terminal such as an integrated equipment control terminal for integrally controlling a plurality of pieces of equipment 1, a factory control terminal for controlling a factory, a manufacturer terminal, or a factory management terminal.

The server computer 60 is programmed to receive parameter information related to operation of the equipment 1 from the equipment terminal 10 or the operator terminal 20, generate primary simulation model information to which operation of the current equipment 1 is reflected, by using the parameter information, reconstruct virtually operable secondary simulation model information by using the primary simulation model information, calculate and compare primary scheduling result information of the primary simulation model information and secondary scheduling result information of the secondary simulation model information, and transmit optimal equipment control information to the equipment terminal 10 or the operator terminal 20 to control the equipment 1 to follow the secondary simulation model information, when the secondary scheduling result information is superior to the primary scheduling result information, and may be a computer provided in a company, factory, enterprise, organization, data center, head office, branch office, sales office, agency, management office, or data center capable of performing an optimized schedule control method through the network 50.

For example, the equipment terminal 10 is a kind of control device capable of controlling the equipment 1, and may use any of various equipment-side terminals such as various controllers, control boards, control panels, microprocessors, central processing units, arithmetic units, computers, command input devices, monitors, data storage devices, and signal transceivers capable of operating the equipment 1 by applying a control signal to each part of the equipment 1 when the equipment 1 produces products.

In addition, the equipment terminal 10 may use any of data terminal devices capable of processing various types of information, e.g., not only the above-mentioned various computers but also various smartphones, wearable devices, smart sensors, smart pads, mobile terminals, personal digital assistants (PDAs), notebook computers, laptop computers, smart cameras, smart camcorders, e-books, smart scanners, and personal computers.

Herein, as shown in FIG. 2, the equipment 1 may include semiconductor equipment including at least one selected from among an equipment front end module EFEM, a loader module, an unloader module, an index module, a loadlock module LLM, a transfer module TM, a process module PM, a loader robot LR, an unloader robot, a transfer robot TR, a gate valve GV, and combinations thereof.

Therefore, for example, a substrate such as a wafer accommodated in a container such as a cassette may be carried into the equipment 1 through the equipment front end module EFEM and moved to one of loadlock modules LLM by the loader robot LR, moved again from the loadlock module LLM to one of a plurality of process modules PM through the transfer module TM by the transfer robot TR, and then processed. Thereafter, the processed substrate may be accommodated back into the container in reverse order through the process module PM, the transfer module TM, and the equipment front end module EFEM and then carried out.

In this case, movement or operation times of modules or robots may be determined in advance or changed due to long-term use, or new modules or robots may be applied. As such, a plurality of substrates may be moved in various manners through a plurality of modules along very complicated and various paths.

According to the present invention, the equipment 1 may be controlled by finding an optimal operation sequence or operation path by monitoring the changing movement or operation times of the modules or robots in real time and simulating a reconstructed virtual model according to various operation sequences.

For example, the operator terminal 20 may use a terminal of an operator, equipment user, equipment manager, or equipment staff who desires the equipment 1 to always maintain high productivity in an optimal state by automatically calculating and applying an optimal operation sequence or operation path without manual calculation and operation command input even when hardware of the equipment 1 is replaced or aged.

Specifically, for example, the operator terminal 20 may use any of data terminal devices capable of processing various types of information, e.g., not only the above-mentioned equipment terminal 10 or various computers but also various smartphones, wearable devices, smart sensors, smart pads, mobile terminals, PDAs, notebook computers, laptop computers, smart cameras, smart camcorders, e-books, smart scanners, and personal computers.

Meanwhile, for example, the equipment terminal 10 and the operator terminal 20 are not necessarily provided independently of each other and may be provided as the same terminal. That is, the operator may operate the equipment terminal 10 as the operator terminal 20.

For example, the equipment terminal 10 and the operator terminal 20 of FIG. 1 may have installed therein various operating programs, applications, hybrid applications, control programs, etc. to be connected to each other through the network 50, and the terminals 10 and 20 connected through the network 50 may use not only a wired communication network but also a wireless communication network, e.g., a mobile communication network such as second generation (2G), third generation (3G), fourth generation (4G), fifth generation (5G), or long-term evolution (LTE), a Wi-Fi communication network, a Bluetooth communication network, a cellular communication network, a code-division multiple access (CDMA) communication network, a LTE communication network, an Ethernet communication network, a Worldwide Interoperability for Microwave Access (WiMAX) communication network, a local area network (LAN), a wide area network (WAN), a radio-frequency (RF) communication network, an infrared communication network, or an optical communication network, and have an internet browser (e.g., Netscape or Internet Explorer) capable of displaying web content in the format of Hypertext Markup Language (HTML), Extensible Markup Language (XML), or HTML5) or a protocol device for internal/external short-/long-range wired/wireless network access.

Meanwhile, as shown in FIG. 1, the server computer 60 may include a program controller PG for controlling programs, and a database DB for storing various types of information.

Particularly, as shown in FIG. 1, the program controller PG may include a parameter information input program 61 for receiving parameter information related to operation of the equipment 1 from the equipment terminal 10 or the operator terminal 20, a primary simulation model generation program 62 for generating primary simulation model information to which operation of the current equipment 1 is reflected, by using the parameter information, a secondary simulation model reconstruction program 63 for reconstructing virtually operable secondary simulation model information by using the primary simulation model information, a simulation result comparison program 64 for calculating and comparing primary scheduling result information of the primary simulation model information and secondary scheduling result information of the secondary simulation model information, an optimal equipment control program 65 for transmitting optimal equipment control information to the equipment terminal 10 or the operator terminal 20 to control the equipment 1 to follow the secondary simulation model information, when the secondary scheduling result information is superior to the primary scheduling result information, a parameter update program 66 for receiving real-time parameter update information of the equipment 1 from the equipment terminal 10 or the operator terminal 20 to monitor the equipment 1 in real time, a primary simulation model verification program 67 for verifying whether current equipment operation information measured by the equipment terminal 10 or a separate sensing device matches the primary simulation model information, a simulation program 68 for virtually simulating the primary simulation model information or virtually simulating the secondary simulation model information, a simulation acceleration program 69 for accelerating the simulation to achieve time synchronization, and other programs 70 for displaying various states of the equipment 1 with graphics, numbers, text, or the like.

Herein, for example, the parameter information input program 61 is a program for receiving the parameter information related to the operation of the equipment 1 from the equipment terminal 10 or the operator terminal 20, and may be a program capable of obtaining various types of parameter information in real time by using the equipment 1, the equipment terminal 10, the sensing device, or the like.

Specifically, for example, the parameter information may include at least one of module information, robot information, process information, operation information, action definition information, operation performability information, substrate location information, hardware operation time information, job operation time information, update information, change information, substrate information, current schedule information, environment information, sensing information, operator input information, operator command information, current action information, wafer location information, productivity information, and combinations thereof.

Therefore, according to the parameter information input program 61, basic data related to the configuration, operation, time, environment, or the like of the equipment 1 for constructing a simulation model to be described below may be obtained, and thus real-time operation of the equipment 1 may be monitored in detail.

For example, the primary simulation model generation program 62 is a program for generating the primary simulation model information to which the operation of the current equipment 1 is reflected, by using the parameter information, and may preferentially construct a simulation model to which the real equipment 1 is reflected, in the server computer 60.

Specifically, for example, the primary simulation model information may include at least one of loadlock module supply information, loadlock module return information, transfer module supply information, transfer module return information, process module supply information, process module return information, and combinations thereof, which represent a current operation sequence of the equipment 1.

Therefore, the virtual primary simulation model reflects the real equipment 1 as it is, and may be constructed to enable simulation of basic data for a secondary simulation model to be reconstructed later.

For example, the secondary simulation model reconstruction program 63 is a program for reconstructing the virtually operable secondary simulation model information by using the primary simulation model information, and may reconstruct a virtual secondary simulation model according to a new operation sequence different from that of the primary simulation model.

Specifically, for example, the secondary simulation model information may include at least one of loadlock module supply prediction information, loadlock module return prediction information, transfer module supply prediction information, transfer module return prediction information, process module supply prediction information, process module return prediction information, and combinations thereof, which represent available virtual operation sequences.

Therefore, the virtual secondary simulation model may be reconstructed to enable various new paths according to new operation sequences by newly reconstructing the real equipment 1, and the reconstructed secondary simulation model may have higher or lower productivity than the primary simulation model. That is, productivity may be virtually calculated by simulating the secondary simulation model a countless number of times and an optimal model may be selected based on the result of calculation.

Figure 3:
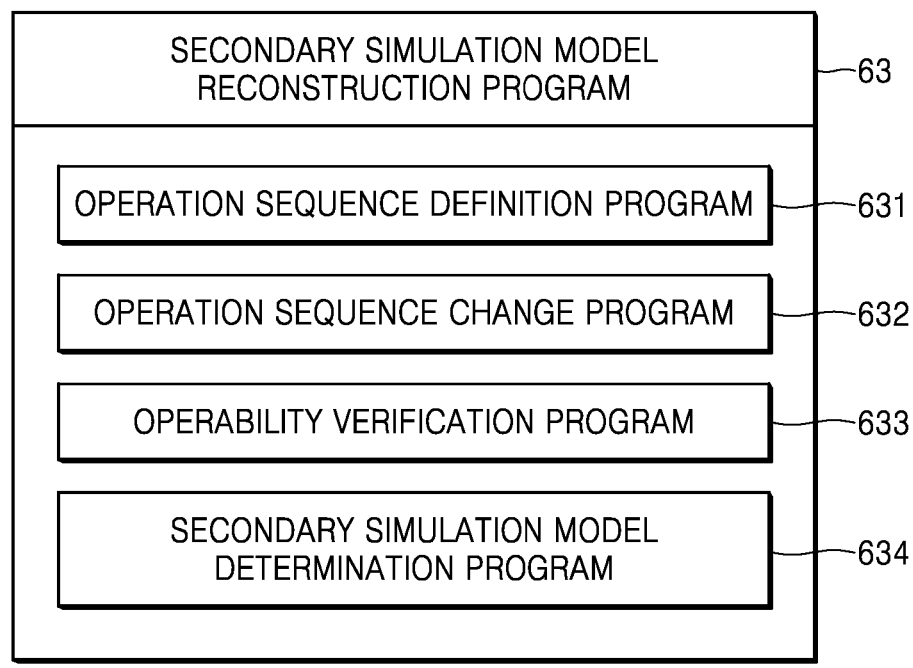
FIG. 3 is a block diagram of a secondary simulation model reconstruction program of the equipment schedule control system of FIG. 1.

FIG. 3 is a block diagram of the secondary simulation model reconstruction program 63 of the equipment schedule control system of FIG. 1.

As shown in FIGS. 1 to 3, specifically, for example, the secondary simulation model reconstruction program 63 may include an operation sequence definition program 631 for defining an operation sequence of the primary simulation model information, an operation sequence change program 632 for newly changing the operation sequence of the primary simulation model information, an operability verification program 633 for verifying operability by simulating the secondary simulation model information according to the newly changed operation sequence, and a secondary simulation model determination program 634 for ultimately determining the verified secondary simulation model information.

Therefore, according to the secondary simulation model reconstruction program 63, a huge number of various operable secondary simulation models may be virtually generated by performing a series of procedures for defining the operation sequence of the primary simulation model information, newly changing the operation sequence of the primary simulation model information, verifying operability by simulating the secondary simulation model information according to the newly changed operation sequence, and ultimately determining the verified secondary simulation model information.

In this case, for example, when three operation parameters such as JOB1, JOB2, and JOB3 are defined, an operation sequence of JOB1-JOB2-JOB3 may be newly changed to JOB1-JOB3-JOB2, JOB2-JOB1-JOB3, JOB2-JOB3-JOB1, JOB3-JOB1-JOB2, JOB3-JOB2-JOB1, or the like, and an operable secondary simulation model may be determined by verifying whether the changed sequence is available. However, the above examples are merely for explanation and various forms and types of operation parameters or environment parameters may be defined and thus a countless number of operation sequences may be automatically simulated.

Meanwhile, as shown in FIG. 1, for example, the simulation result comparison program 64 is a program for calculating and comparing the primary scheduling result information of the primary simulation model information and the secondary scheduling result information of the secondary simulation model information, and may compare, for example, productivities, e.g., total process times or total substrate productions, of the primary and secondary simulation models.

Specifically, for example, the primary scheduling result information may include at least one of a substrate processing time of the current equipment, a substrate processing quantity of the current equipment, a substrate yield of the current equipment, productivity of the current equipment, production efficiency of the current equipment, and combinations thereof.

For example, the secondary scheduling result information corresponds to the primary scheduling result information so as to be comparable to the primary scheduling result information and may include at least one of a substrate processing time of the reconstructed equipment, a substrate processing quantity of the reconstructed equipment, a substrate yield of the reconstructed equipment, productivity of the reconstructed equipment, production efficiency of the reconstructed equipment, and combinations thereof.

For example, the optimal equipment control program 65 is a program for transmitting the optimal equipment control information to the equipment terminal 10 or the operator terminal 20 to control the equipment 1 to follow the secondary simulation model information, when the secondary scheduling result information is superior to the primary scheduling result information, and thus the equipment 1 may be controlled to immediately and automatically operate according to the new optimal operation sequence in real time or to automatically operate according to the new optimal operation sequence after the approval of the operator is received.

Specifically, for example, the optimal equipment control information may include at least one of loadlock module supply command information, loadlock module return command information, transfer module supply command information, transfer module return command information, process module supply command information, process module return command information, and combinations thereof, which represent an optimal operation sequence to control the equipment to follow the secondary simulation model information.

Therefore, according to the optimal equipment control program 65, the equipment 1 may be controlled to always operate in an optimal state in real time, and thus the optimal state may be automatically maintained even when hardware of the equipment 1 is changed or aged.

As such, inconvenience experienced by the operator to stop the equipment 1, manually calculate appropriateness one by one and, when necessary, design and re-apply a new logic to the equipment 1 instead of an already used fixed logic may be prevented, the equipment 1 may be controlled according to an optimal operation sequence based on a simulation result obtained by constructing a virtual simulation model through real-time monitoring of the equipment 1 and repeatedly reconstructing an operation sequence by using the virtual simulation model, and thus the equipment 1 may always be rapidly and automatically controlled according to the optimal operation sequence without being stopped even when a process environment, equipment characteristics, a hardware configuration of the equipment 1, a substrate type, or process characteristics are changed.

Meanwhile, as shown in FIG. 1, the parameter update program 66 is a program for receiving the real-time parameter update information of the equipment 1 from the equipment terminal 10 or the operator terminal 20 to monitor the equipment 1 in real time, and thus the equipment 1 may be not only monitored in real time but also rapidly controlled to an optimal operation state through real-time simulation.

For example, the primary simulation model verification program 67 is a program for verifying whether the current equipment operation information measured by the equipment terminal 10 or the separate sensing device matches the primary simulation model information, and may increase the accuracy of the primary simulation model to increase the accuracy of the secondary simulation model later, and thus also increase the accuracy of simulation.

For example, the simulation program 68 is a program for virtually simulating the primary simulation model information or virtually simulating the secondary simulation model information, and the simulation of these models may be performed only in the program or the progress of the simulation may be viewed to the operator by using a two- or three-dimensional graph.

For example, the simulation acceleration program 69 may reduce a simulation time by accelerating the simulation to 1×, 10×, 100×, 1000×, or the like to achieve time synchronization.

Therefore, the equipment 1 may always maintain the highest productivity in an optimal operation state, the operator may greatly increase the convenience of work by not providing or minimizing manipulation of the operator, and significantly reduce work time, labor, and cost by automating operation optimization.

Herein, the above-described programs may operate in connection with an executable program, a screen control program, or a user application downloaded or installed in various terminals and computers such as the equipment terminal 10, the operator terminal 20, or the server computer 60.

However, the above-described programs are not limited to being connected to an executable program or a smartphone application and may be connected to various types of terminals.

Meanwhile, as shown in FIG. 1, the database DB may include a parameter information database 71 for storing the parameter information, a primary simulation model information database 72 for storing the primary simulation model information, a secondary simulation model information database 73 for storing the secondary simulation model information, a primary scheduling result information database 74 for storing the primary scheduling result information, a secondary scheduling result information database 75 for storing the secondary scheduling result information, an optimal equipment control information database 76 for storing the optimal equipment control information, a real-time parameter update information database 77 for storing the real-time parameter update information, an equipment operation information database 78 for storing the equipment operation information, and other information databases 79 for storing other various basic information, graph information, interface information, etc.

Therefore, the server computer 60 may perform an optimized schedule control method including, by the parameter information input program 61, receiving the parameter information related to the operation of the equipment 1 from the equipment terminal 10 or the operator terminal 20, by the primary simulation model generation program 62, generating the primary simulation model information to which the operation of the current equipment 1 is reflected, by using the parameter information, by the secondary simulation model reconstruction program 63, reconstructing the virtually operable secondary simulation model information by using the primary simulation model information, by the simulation result comparison program 64, calculating and comparing the primary scheduling result information of the primary simulation model information and the secondary scheduling result information of the secondary simulation model information and, by the optimal equipment control program 65, transmitting the optimal equipment control information to the equipment terminal 10 or the operator terminal 20 to control the equipment 1 to follow the secondary simulation model information, when the secondary scheduling result information is superior to the primary scheduling result information.

Figure 4:
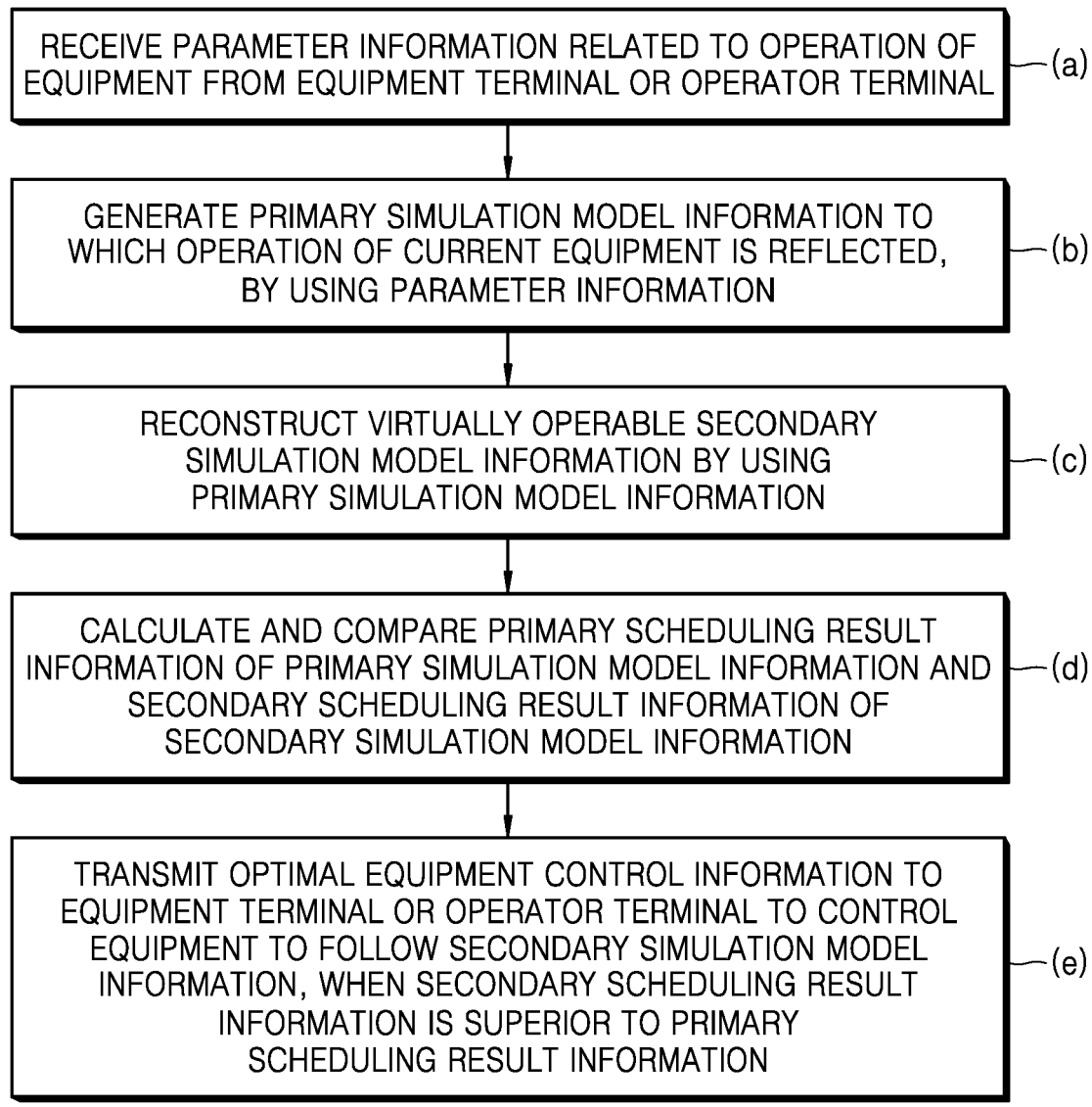
FIG. 4 is a flowchart of an equipment schedule control method according to some embodiments of the present invention.

FIG. 4 is a flowchart of an equipment schedule control method according to some embodiments of the present invention.

As shown in FIGS. 1 to 4, the equipment schedule control method according to some embodiments of the present invention may include (a) by the parameter information input program 61, receiving the parameter information related to the operation of the equipment 1 from the equipment terminal 10 or the operator terminal 20, (b) by the primary simulation model generation program 62, generating the primary simulation model information to which the operation of the current equipment 1 is reflected, by using the parameter information, (c) by the secondary simulation model reconstruction program 63, reconstructing the virtually operable secondary simulation model information by using the primary simulation model information, (d) by the simulation result comparison program 64, calculating and comparing the primary scheduling result information of the primary simulation model information and the secondary scheduling result information of the secondary simulation model information, and (e) by the optimal equipment control program 65, transmitting the optimal equipment control information to the equipment terminal 10 or the operator terminal 20 to control the equipment 1 to follow the secondary simulation model information, when the secondary scheduling result information is superior to the primary scheduling result information.

However, the present invention is not limited to the illustration and various other steps may be additionally included.

Figure 5:
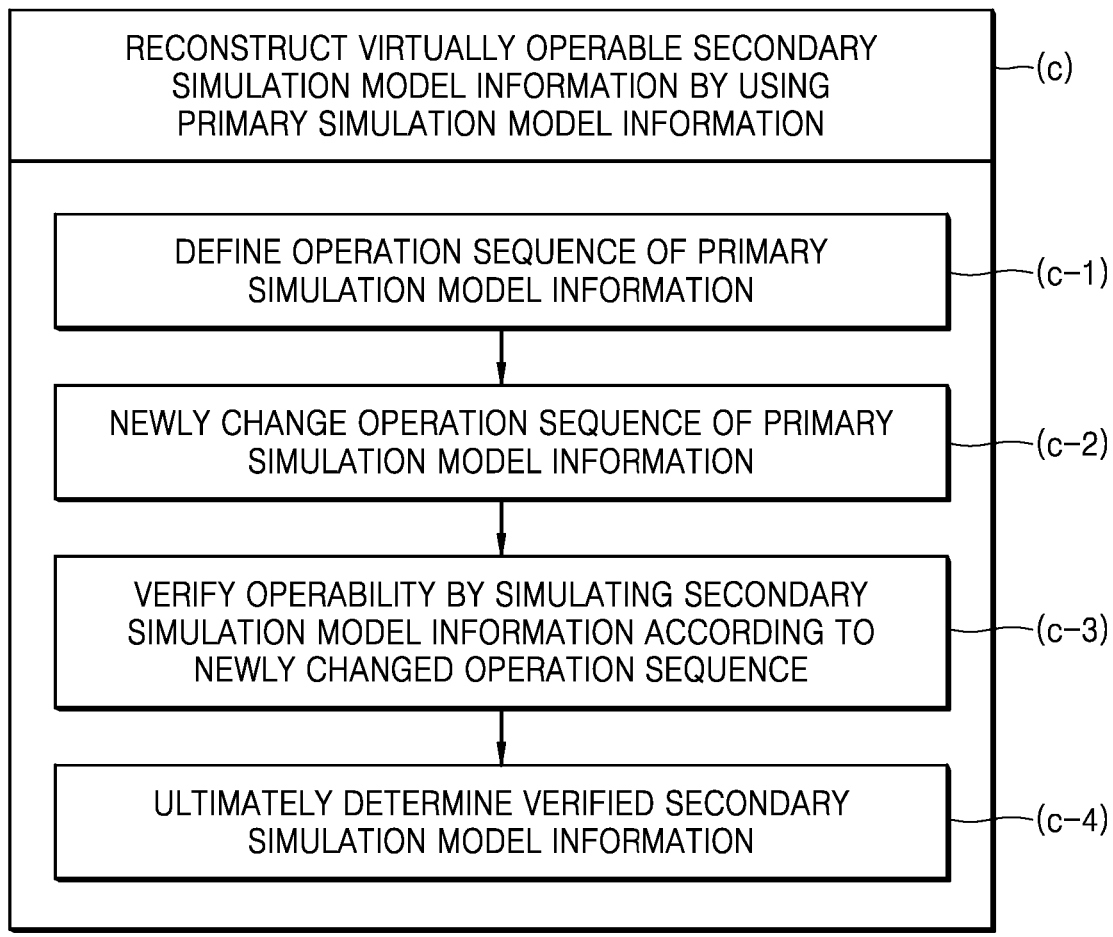
FIG. 5 is a flowchart of step (c) of the equipment schedule control method of FIG. 4.

FIG. 5 is a flowchart of step (c) of the equipment schedule control method of FIG. 4.

Specifically, for example, as shown in FIG. 5, step (c) may include (c-1) by the operation sequence definition program 631, defining the operation sequence of the primary simulation model information, (c-2) by the operation sequence change program 632, newly changing the operation sequence of the primary simulation model information, (c-3) by the operability verification program 633, verifying operability by simulating the secondary simulation model information according to the newly changed operation sequence, and (c-4) by the secondary simulation model determination program 634, ultimately determining the verified secondary simulation model information.

Figure 6:
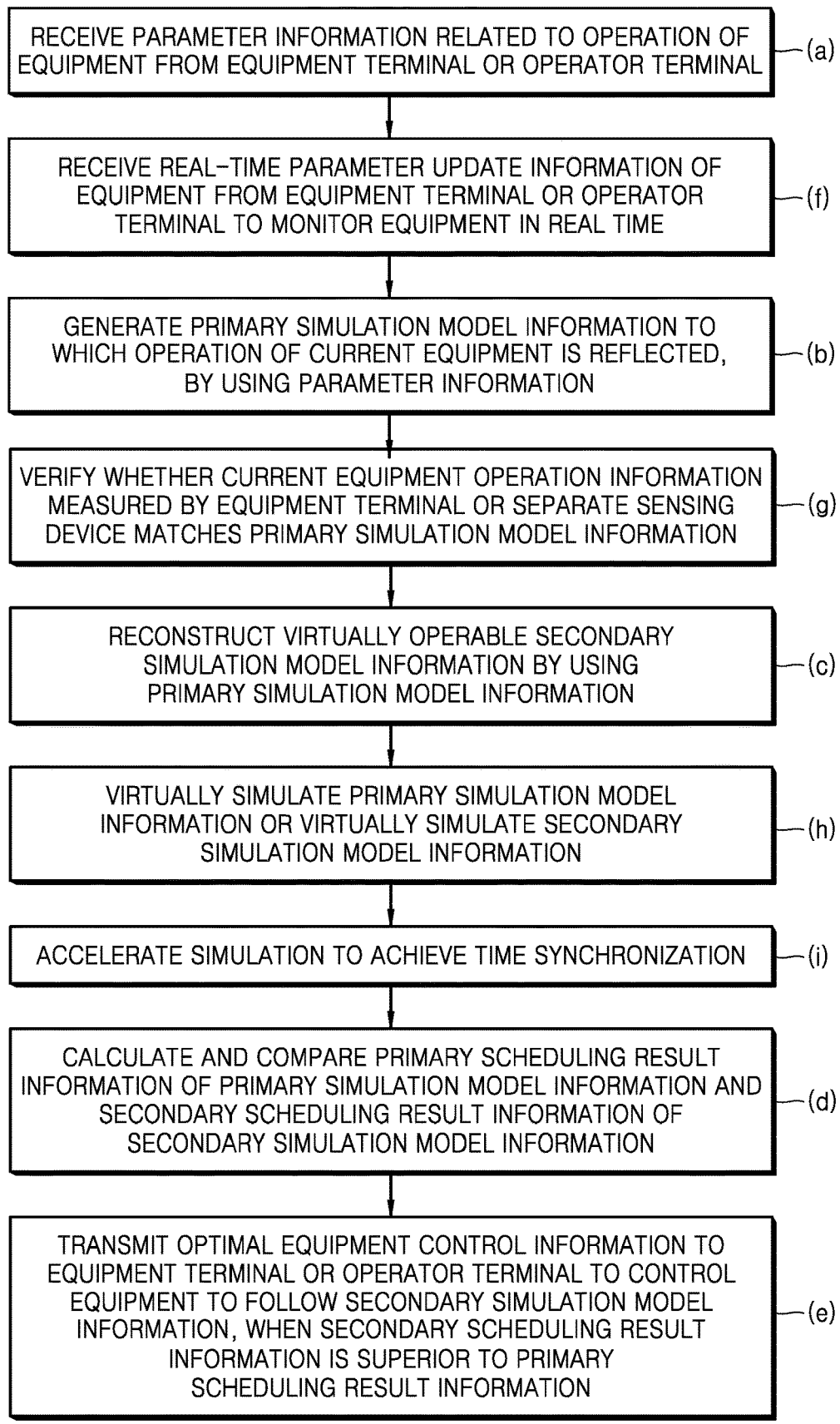
FIG. 6 is a flowchart of an equipment schedule control method according to other embodiments of the present invention.

FIG. 6 is a flowchart of an equipment schedule control method according to other embodiments of the present invention.

As shown in FIGS. 1 to 6, the equipment schedule control method according to other embodiments of the present invention may include (a) by the parameter information input program 61, receiving the parameter information related to the operation of the equipment 1 from the equipment terminal 10 or the operator terminal 20, (f) by the parameter update program 66, receiving the real-time parameter update information of the equipment 1 from the equipment terminal 10 or the operator terminal 20 to monitor the equipment 1 in real time, (b) by the primary simulation model generation program 62, generating the primary simulation model information to which the operation of the current equipment 1 is reflected, by using the parameter information, (g) by the primary simulation model verification program 67, verifying whether the current equipment operation information measured by the equipment terminal 10 or the separate sensing device matches the primary simulation model information, (c) by the secondary simulation model reconstruction program 63, reconstructing the virtually operable secondary simulation model information by using the primary simulation model information, (h) by the simulation program 68, virtually simulating the primary simulation model information or virtually simulating the secondary simulation model information, (i) by the simulation acceleration program 69, accelerating the simulation to achieve time synchronization, (d) by the simulation result comparison program 64, calculating and comparing the primary scheduling result information of the primary simulation model information and the secondary scheduling result information of the secondary simulation model information, and (e) by the optimal equipment control program 65, transmitting the optimal equipment control information to the equipment terminal 10 or the operator terminal 20 to control the equipment 1 to follow the secondary simulation model information, when the secondary scheduling result information is superior to the primary scheduling result information.

As such, based on the equipment schedule control method according to various embodiments of the present invention, a piece of equipment 1 may be connected in a wired/wireless manner and optimally scheduled all the time, or a plurality of pieces of equipment 1 may be connected through the network 50 and optimally scheduled all the time.

Figure 7:
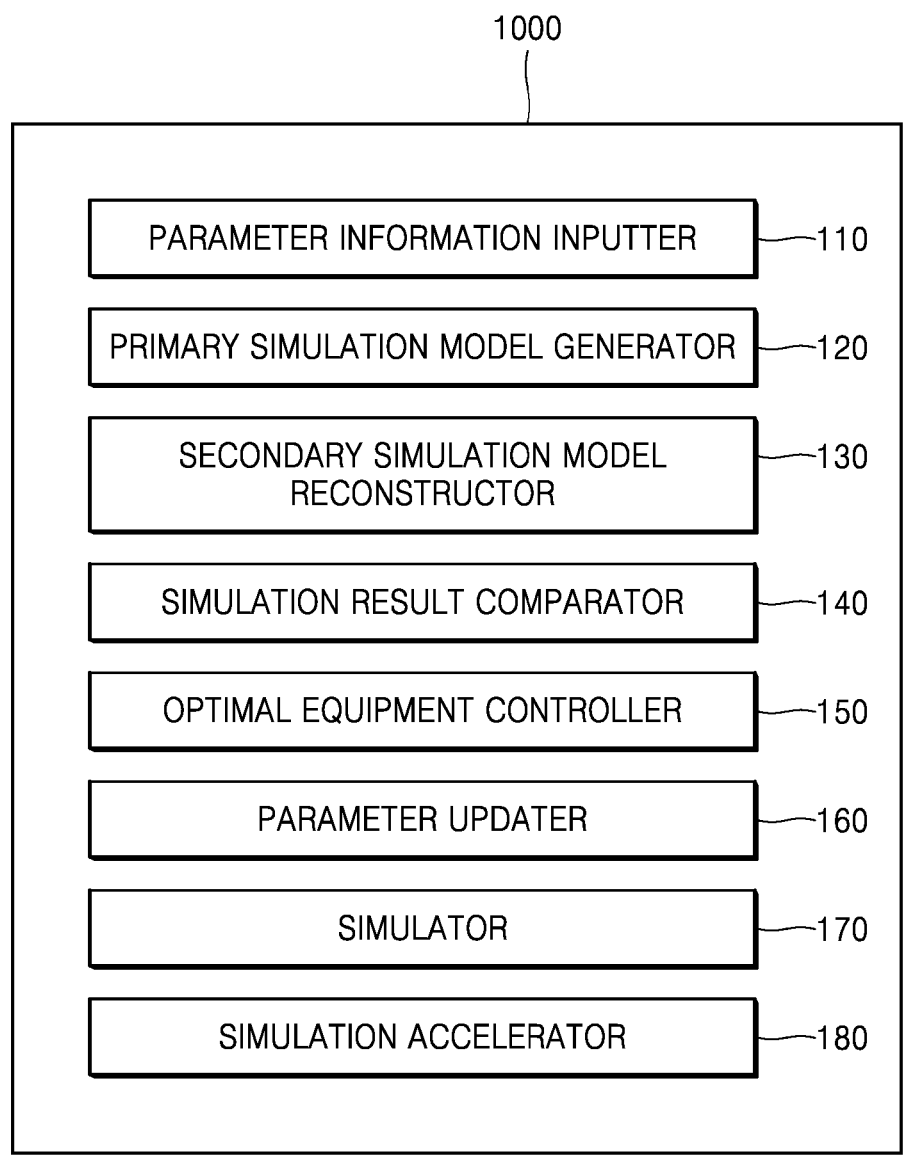
FIG. 7 is a block diagram of an equipment schedule control apparatus according to some embodiments of the present invention.

FIG. 7 is a block diagram of an equipment schedule control apparatus 1000 according to some embodiments of the present invention.

As shown in FIGS. 1 to 7, the equipment schedule control apparatus 1000 according to some embodiments of the present invention is a schedule control apparatus that may be added to a control device inside the equipment 1 or separately mounted outside the equipment 1, and may include a parameter information inputter 110 for receiving parameter information related to operation of the equipment 1, a primary simulation model generator 120 for generating primary simulation model information to which operation of the current equipment 1 is reflected, by using the parameter information, a secondary simulation model reconstructor 130 for reconstructing virtually operable secondary simulation model information by using the primary simulation model information, a simulation result comparator 140 for calculating and comparing primary scheduling result information of the primary simulation model information and secondary scheduling result information of the secondary simulation model information, an optimal equipment controller 150 for applying optimal equipment control information to the equipment 1 to control the equipment 1 to follow the secondary simulation model information, when the secondary scheduling result information is superior to the primary scheduling result information, a parameter updater 160 for receiving real-time parameter update information of the equipment 1 from the equipment terminal 10 or the operator terminal 20 to monitor the equipment 1 in real time, a simulator 170 for virtually simulating the primary simulation model information or virtually simulating the secondary simulation model information, and a simulation accelerator 180 for accelerating the simulation to achieve time synchronization.

Herein, the equipment 1 may include semiconductor equipment including at least one selected from among an equipment front end module EFEM, a loader module, an unloader module, an index module, a loadlock module LLM, a transfer module TM, a process module PM, a loader robot LR, an unloader robot, a transfer robot TR, a gate valve GV, and combinations thereof.

Therefore, the equipment schedule control apparatus 1000 according to some embodiments of the present invention may be mounted inside or outside the equipment 1 to optimally schedule the equipment 1 in real time.

Figure 8:
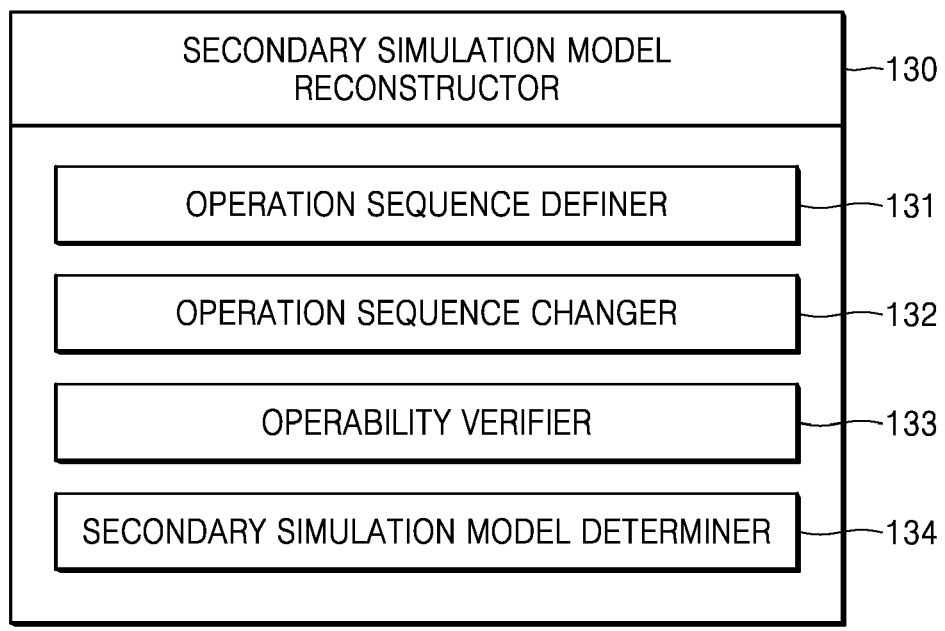
FIG. 8 is a block diagram of a secondary simulation model reconstructor of the equipment schedule control apparatus of FIG. 7.

FIG. 8 is a block diagram of the secondary simulation model reconstructor 130 of the equipment schedule control apparatus 1000 of FIG. 7.

Specifically, for example, as shown in FIGS. 1 to 8, the secondary simulation model reconstructor 130 may include an operation sequence definer 131 for defining an operation sequence of the primary simulation model information, an operation sequence changer 132 for newly changing the operation sequence of the primary simulation model information, an operability verifier 133 for verifying operability by simulating the secondary simulation model information according to the newly changed operation sequence, and a secondary simulation model determiner 134 for ultimately determining the verified secondary simulation model information.

Therefore, according to the secondary simulation model reconstructor 130, a series of functions for defining the operation sequence of the primary simulation model information, newly changing the operation sequence of the primary simulation model information, verifying operability by simulating the secondary simulation model information according to the newly changed operation sequence, and ultimately determining the verified secondary simulation model information may be performed.

As such, the equipment schedule control apparatus 1000 according to some embodiments of the present invention may be embedded in the equipment 1 or additionally mounted on the existing equipment 1 in order to perform an automatic scheduling function when the equipment 1 produces products.

Figure 9:
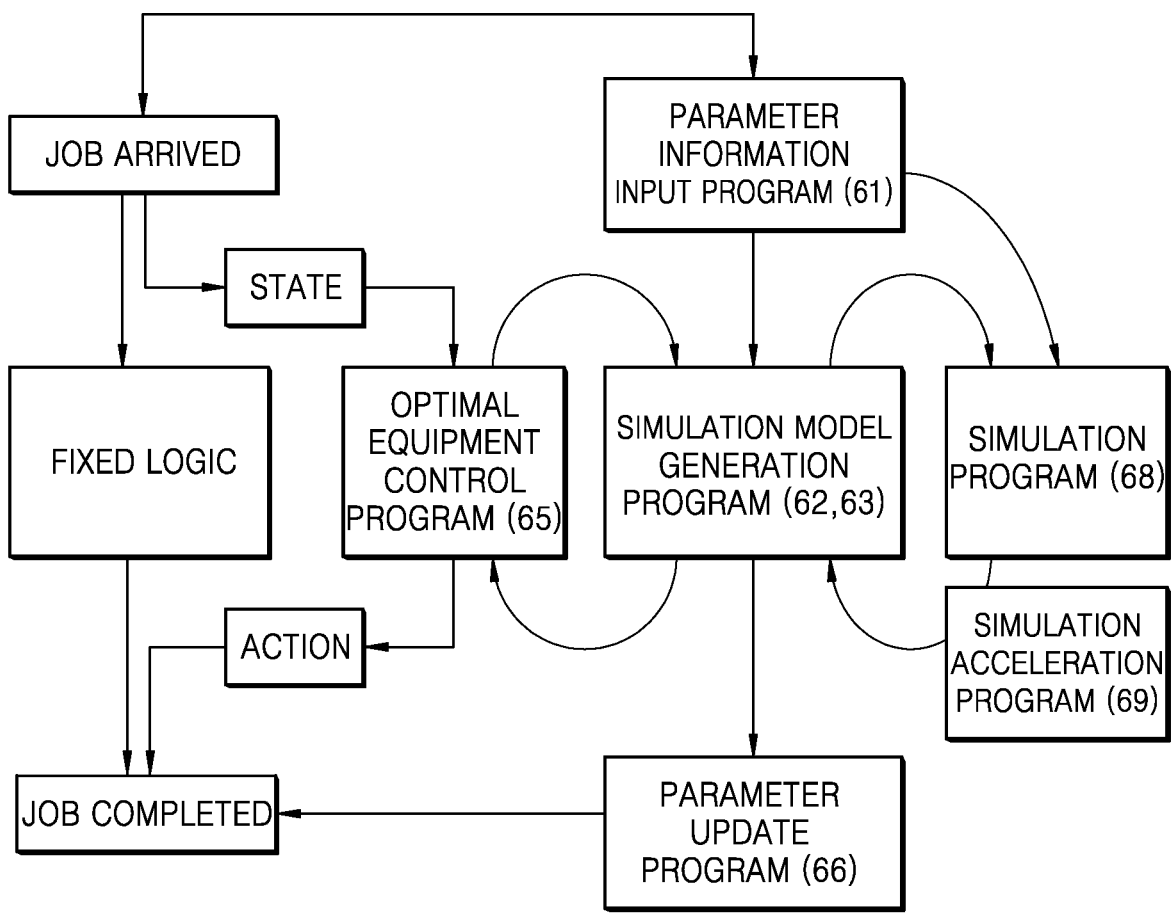
FIG. 9 is a block diagram of an equipment schedule control system according to other embodiments of the present invention.

FIG. 9 is a block diagram of an equipment schedule control system according to other embodiments of the present invention.

As shown in FIG. 9, the equipment schedule control system according to other embodiments of the present invention may receive parameters related to the configuration, specifications, individual operation time, environment, etc. of the equipment 1 in advance by the parameter information input program 61.

Then, while being operated by an existing "Fixed Logic" from "JOB arrived" indicating that a wafer has arrived at the equipment 1 to "JOB completed" indicating that a processed wafer is waiting to be released, the primary simulation model generation program 62 and the secondary simulation model reconstruction program 63 may receive current state information STATE and simulate the simulation models by using the simulation program 68 and, at this time, the simulation may be accelerated using the simulation acceleration program 69 and performed until an optimal operation condition is found.

In this case, when the optimal equipment control program 65 has found the optimal operation condition, an operation control signal ACTION to which the optimal operation condition is reflected may be reflected to the equipment 1 in real time and the operation condition may be updated by the parameter update program 66.

Figure 10:
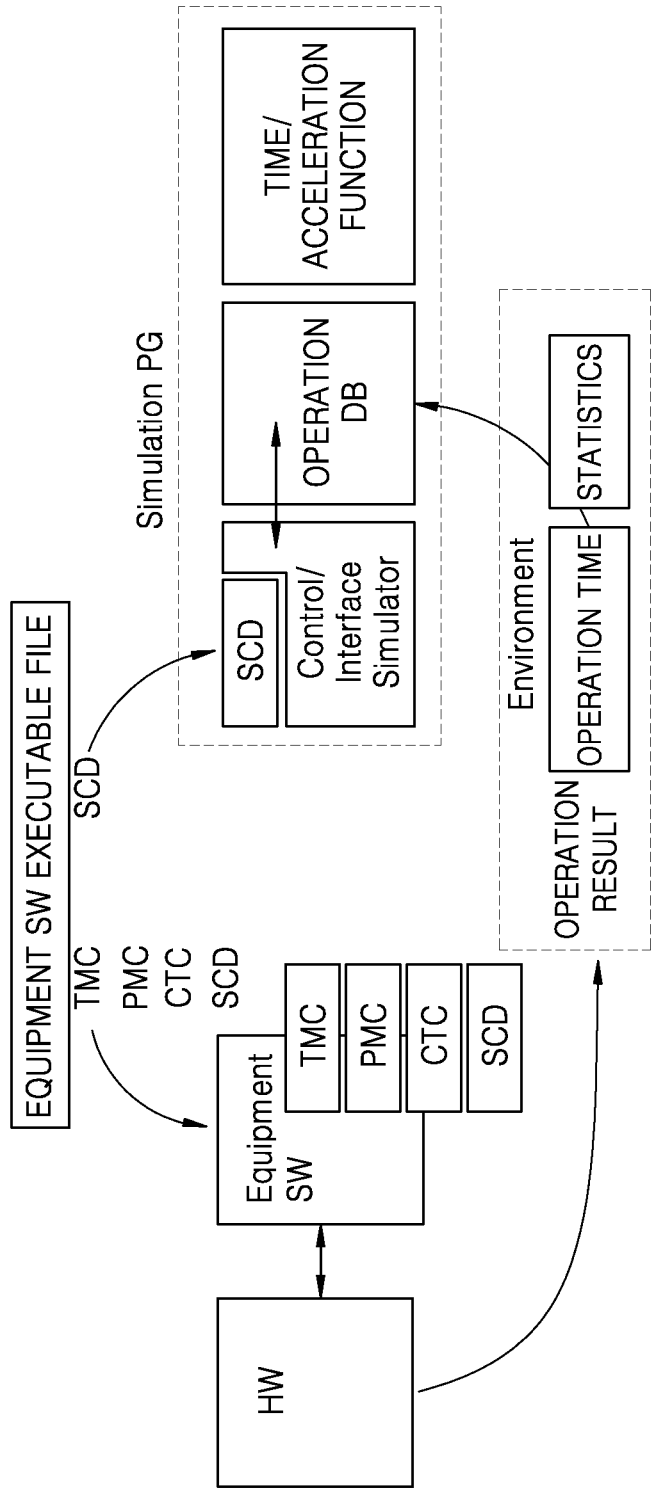
FIG. 10 is a block diagram of an equipment schedule control system according to other embodiments of the present invention.

FIG. 10 is a block diagram of an equipment schedule control system according to other embodiments of the present invention.

As shown in FIG. 10, equipment software (SW) may include a transfer module controller (TMC), a process module controller (PMC), a cluster tool controller (CTC), and a schedule control device (SCD), the equipment schedule control system according to other embodiments of the present invention may include an executable file of the SCD which executes the software, and a "Simulation PG" may repeatedly perform simulation by using environment information such as an operation time or statistics based on information of an operation database DB and an operation result input from equipment hardware (HW) through a Control/Interface Simulator.

FIG. 11 is a table showing an example of parameters of an equipment schedule control system according to other embodiments of the present invention.

As shown in FIG. 11, the parameters of the equipment schedule control system according to other embodiments of the present invention may name operations Job1, Job2, and Job3 corresponding to a plurality of loading plates LP1, LP2, and LP3, provide serial numbers, and gather statistics by using a "Self-Test Sheet" including result values such as operation times or productivities.

Figure 12:
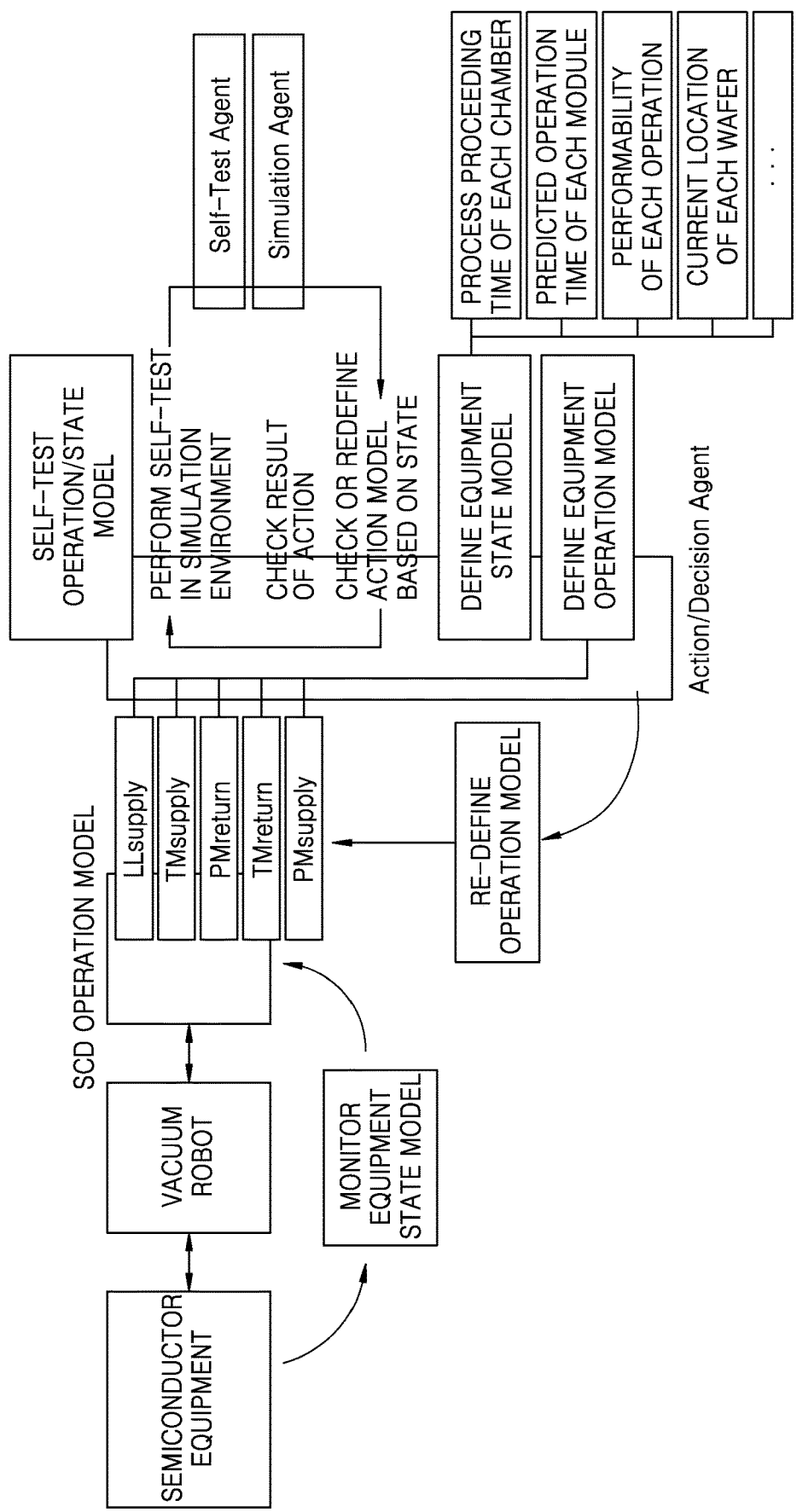
FIG. 12 is a block diagram of an equipment schedule control system according to other embodiments of the present invention.

FIG. 12 is a block diagram of an equipment schedule control system according to other embodiments of the present invention.

As shown in FIG. 12, a SCD operation model may construct and monitor an equipment state model by receiving data from semiconductor equipment, a vacuum robot, etc., redefine the operation model in the order of, for example, loadlock supply (LLsupply), transfer module supply (TMsupply), process module return (PMreturn), transfer module return (TMreturn), and process module supply (PMsupply), perform simulation and a self-test based on the redefined operation model by using a simulation program (e.g., a Simulation Agent) and a simulation result comparison program (e.g., a Self-Test Agent), and check or redefine an action model based on a state by checking a result of action.

In this case, the equipment state model may be defined or the equipment operation model may be defined based on a process proceeding time of each chamber, a predicted operation time of each module, performability of each operation, a current location of each wafer, etc.

When an equipment state model or equipment operation model having an optimal productivity is selected, an optimal equipment control program (e.g., an Action/Decision Agent) may automatically control the equipment 1 to an optimal operation sequence.

The present invention can also be embodied as computer-readable code on a computer-readable recording medium.

The computer-readable recording medium is any data storage device that can store data which can be thereafter read by a computer system.

Examples of the computer-readable recording medium may include not only the above-described server computer 60 but also read-only memory (ROM), random-access memory (RAM), CD-ROMs, magnetic tapes, floppy disks, magneto-optical disks, optical data storage devices, flash memory, universal serial bus (USB) memory, and carrier waves (such as data transmission through the Internet).

The computer-readable recording medium can also be distributed over network coupled computer systems so that the computer-readable code is stored and executed in a distributed fashion.

According to the afore-described embodiments of the present invention, equipment may be controlled according to an optimal operation sequence based on a simulation result obtained by constructing a virtual simulation model through real-time monitoring of the equipment and repeatedly reconstructing an operation sequence by using the virtual simulation model, and thus the equipment may always be rapidly and automatically controlled according to the optimal operation sequence without being stopped even when a process environment, equipment characteristics, a hardware configuration of the equipment, a substrate type, or process characteristics are changed. However, the scope of the present invention is not limited to the above effect.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. An equipment schedule control method using a computer system comprising a server computer connected to at least one equipment terminal and at least one operator terminal through a network, wherein the server computer comprises:
a parameter information input program for receiving parameter information related to operation of equipment from the equipment terminal or the operator terminal;
a primary simulation model generation program for generating primary simulation model information to which operation of current equipment is reflected, by using the parameter information;
a secondary simulation model reconstruction program for reconstructing virtually operable secondary simulation model information by using the primary simulation model information;
a simulation result comparison program for calculating and comparing primary scheduling result information of the primary simulation model information and secondary scheduling result information of the secondary simulation model information;
an optimal equipment control program for transmitting optimal equipment control information to the equipment terminal or the operator terminal to control the equipment to follow the secondary simulation model information, when the secondary scheduling result information is superior to the primary scheduling result information;
a parameter information database for storing the parameter information;
a primary simulation model information database for storing the primary simulation model information;
a secondary simulation model information database for storing the secondary simulation model information;
a primary scheduling result information database for storing the primary scheduling result information;
a secondary scheduling result information database for storing the secondary scheduling result information; and
an optimal equipment control information database for storing the optimal equipment control information, and wherein the equipment schedule control method comprises:
(a) by the parameter information input program, receiving the parameter information related to the operation of the equipment from the equipment terminal or the operator terminal;
(b) by the primary simulation model generation program, generating the primary simulation model information to which the operation of the current equipment is reflected, by using the parameter information;
(c) by the secondary simulation model reconstruction program, reconstructing the virtually operable secondary simulation model information by using the primary simulation model information;
(d) by the simulation result comparison program, calculating and comparing the primary scheduling result information of the primary simulation model information and the secondary scheduling result information of the secondary simulation model information; and (e) by the optimal equipment control program, transmitting the optimal equipment control information to the equipment terminal or the operator terminal to control the equipment to follow the secondary simulation model information, when the secondary scheduling result information is superior to the primary scheduling result information.

2. The equipment schedule control method of claim 1, wherein the equipment comprises semiconductor equipment comprising at least one selected from among an equipment front end module, a loader module, an unloader module, an index module, a loadlock module, a transfer module, a process module, a loader robot, an unloader robot, a transfer robot, a gate valve, and combinations thereof.

3. The equipment schedule control method of claim 1, wherein the parameter information comprises at least one of module information, robot information, process information, operation information, action definition information, operation performability information, substrate location information, hardware operation time information, job operation time information, update information, change information, substrate information, current schedule information, environment information, sensing information, operator input information, operator command information, current action information, wafer location information, productivity information, and combinations thereof.

4. The equipment schedule control method of claim 1, wherein the primary simulation model information comprises at least one of loadlock module supply information, loadlock module return information, transfer module supply information, transfer module return information, process module supply information, process module return information, and combinations thereof, which represent a current operation sequence of the equipment.

5. The equipment schedule control method of claim 4, wherein the secondary simulation model information comprises at least one of loadlock module supply prediction information, loadlock module return prediction information, transfer module supply prediction information, transfer module return prediction information, process module supply prediction information, process module return prediction information, and combinations thereof, which represent available virtual operation sequences.

6. The equipment schedule control method of claim 1, wherein the primary scheduling result information comprises at least one of a substrate processing time of the current equipment, a substrate processing quantity of the current equipment, a substrate yield of the current equipment, productivity of the current equipment, production efficiency of the current equipment, and combinations thereof.

7. The equipment schedule control method of claim 6, wherein the secondary scheduling result information comprises at least one of a substrate processing time of reconstructed equipment, a substrate processing quantity of the reconstructed equipment, a substrate yield of the reconstructed equipment, productivity of the reconstructed equipment, production efficiency of the reconstructed equipment, and combinations thereof.

8. The equipment schedule control method of claim 1, wherein the optimal equipment control information comprises at least one of loadlock module supply command information, loadlock module return command information, transfer module supply command information, transfer module return command information, process module supply command information, process module return command information, and combinations thereof, which represent an optimal operation sequence to control the equipment to follow the secondary simulation model information.

9. The equipment schedule control method of claim 1, wherein the secondary simulation model reconstruction program comprises:
an operation sequence definition program for defining an operation sequence of the primary simulation model information; and
an operation sequence change program for newly changing the operation sequence of the primary simulation model information, and
wherein step (c) comprises:
(c-1) by the operation sequence definition program, defining the operation sequence of the primary simulation model information; and
(c-2) by the operation sequence change program, newly changing the operation sequence of the primary simulation model information.

10. The equipment schedule control method of claim 9, wherein the secondary simulation model reconstruction program further comprises an operability verification program for verifying operability by simulating the secondary simulation model information according to the newly changed operation sequence, and
wherein step (c) further comprises (c-3) by the operability verification program, verifying operability by simulating the secondary simulation model information according to the newly changed operation sequence.

11. The equipment schedule control method of claim 10, wherein the secondary simulation model reconstruction program further comprises a secondary simulation model determination program for ultimately determining the verified secondary simulation model information, and
wherein step (c) further comprises (c-4) by the secondary simulation model determination program, ultimately determining the verified secondary simulation model information.

12. The equipment schedule control method of claim 1, wherein the server computer further comprises:
a parameter update program for receiving real-time parameter update information of the equipment from the equipment terminal or the operator terminal to monitor the equipment in real time; and
a real-time parameter update information database for storing the real-time parameter update information, and
wherein the equipment schedule control method further comprises, before step (b), (f) by the parameter update program, receiving the real-time parameter update information of the equipment from the equipment terminal or the operator terminal to monitor the equipment in real time.

13. The equipment schedule control method of claim 1, wherein the server computer further comprises:
a primary simulation model verification program for verifying whether current equipment operation information measured by the equipment terminal or a separate sensing device matches the primary simulation model information; and
an equipment operation information database for storing the equipment operation information, and
wherein the equipment schedule control method further comprises, before step (c), (g) by the primary simulation model verification program, verifying whether the current equipment operation information measured by the equipment terminal or the separate sensing device matches the primary simulation model information.

14. The equipment schedule control method of claim 1, wherein the server computer further comprises a simulation program for virtually simulating the primary simulation model information or virtually simulating the secondary simulation model information, and wherein the equipment schedule control method further comprises, before step (d), (h) by the simulation program, virtually simulating the primary simulation model information or virtually simulating the secondary simulation model information.

15. The equipment schedule control method of claim 14, wherein the server computer further comprises a simulation acceleration program for accelerating the simulation to achieve time synchronization, and wherein the equipment schedule control method further comprises, after step (h), (i) by the simulation acceleration program, accelerating the simulation to achieve time synchronization.

16. An equipment schedule control apparatus comprising:
a parameter information inputter for receiving parameter information related to operation of equipment;
a primary simulation model generator for generating primary simulation model information to which operation of current equipment is reflected, by using the parameter information;
a secondary simulation model reconstructor for reconstructing virtually operable secondary simulation model information by using the primary simulation model information;
a simulation result comparator for calculating and comparing primary scheduling result information of the primary simulation model information and secondary scheduling result information of the secondary simulation model information; and
an optimal equipment controller for applying optimal equipment control information to the equipment to control the equipment to follow the secondary simulation model information, when the secondary scheduling result information is superior to the primary scheduling result information.

17. The equipment schedule control apparatus of claim 16, wherein the equipment comprises semiconductor equipment comprising at least one selected from among an equipment front end module, a loader module, an unloader module, an index module, a loadlock module, a transfer module, a process module, a loader robot, an unloader robot, a transfer robot, a gate valve, and combinations thereof.

18. The equipment schedule control apparatus of claim 16, wherein the secondary simulation model reconstructor comprises:
an operation sequence definer for defining an operation sequence of the primary simulation model information;
an operation sequence changer for newly changing the operation sequence of the primary simulation model information;
an operability verifier for verifying operability by simulating the secondary simulation model information according to the newly changed operation sequence; and
a secondary simulation model determiner for ultimately determining the verified secondary simulation model information.

19. The equipment schedule control apparatus of claim 16, further comprising:

a parameter updater for receiving real-time parameter update information of the equipment from an equipment terminal or an operator terminal to monitor the equipment in real time;
a simulator for virtually simulating the primary simulation model information or virtually simulating the secondary simulation model information; and
a simulation accelerator for accelerating the simulation to achieve time synchronization.

20. An equipment schedule control method using a computer system comprising a server computer connected to at least one equipment terminal and at least one operator terminal through a network,
wherein the server computer comprises:
a parameter information input program for receiving parameter information related to operation of equipment from the equipment terminal or the operator terminal;
a primary simulation model generation program for generating primary simulation model information to which operation of current equipment is reflected, by using the parameter information;
a secondary simulation model reconstruction program for reconstructing virtually operable secondary simulation model information by using the primary simulation model information;
a simulation result comparison program for calculating and comparing primary scheduling result information of the primary simulation model information and secondary scheduling result information of the secondary simulation model information;
an optimal equipment control program for transmitting optimal equipment control information to the equipment terminal or the operator terminal to control the equipment to follow the secondary simulation model information, when the secondary scheduling result information is superior to the primary scheduling result information;
a parameter information database for storing the parameter information;
a primary simulation model information database for storing the primary simulation model information;
a secondary simulation model information database for storing the secondary simulation model information;
a primary scheduling result information database for storing the primary scheduling result information;
a secondary scheduling result information database for storing the secondary scheduling result information; and
an optimal equipment control information database for storing the optimal equipment control information,
wherein the equipment schedule control method comprises:
(a) by the parameter information input program, receiving the parameter information related to the operation of the equipment from the equipment terminal or the operator terminal;
(b) by the primary simulation model generation program, generating the primary simulation model information to which the operation of the current equipment is reflected, by using the parameter information;
(c) by the secondary simulation model reconstruction program, reconstructing the virtually operable secondary simulation model information by using the primary simulation model information;
(d) by the simulation result comparison program, calculating and comparing the primary scheduling result information of the primary simulation model information and the secondary scheduling result information of the secondary simulation model information; and (e) by the optimal equipment control program, transmitting the optimal equipment control information to the equipment terminal or the operator terminal to control the equipment to follow the secondary simulation model information, when the secondary scheduling result information is superior to the primary scheduling result information, wherein the equipment comprises semiconductor equipment comprising at least one selected from among an equipment front end module, a loader module, an unloader module, an index module, a loadlock module, a transfer module, a process module, a loader robot, an unloader robot, a transfer robot, a gate valve, and combinations thereof, wherein the parameter information comprises at least one of module information, robot information, process information, operation information, action definition information, operation performability information, substrate location information, hardware operation time information, job operation time information, update information, change information, substrate information, current schedule information, environment information, sensing information, operator input information, operator command information, current action information, wafer location information, productivity information, and combinations thereof, wherein the primary simulation model information comprises at least one of loadlock module supply information, loadlock module return information, transfer module supply information, transfer module return information, process module supply information, process module return information, and combinations thereof, which represent a current operation sequence of the equipment, wherein the secondary simulation model information comprises at least one of loadlock module supply prediction information, loadlock module return prediction information, transfer module supply prediction information, transfer module return prediction information, process module supply prediction information, process module return prediction information, and combinations thereof, which represent available virtual operation sequences, wherein the primary scheduling result information comprises at least one of a substrate processing time of the current equipment, a substrate processing quantity of the current equipment, a substrate yield of the current equipment, productivity of the current equipment, production efficiency of the current equipment, and combinations thereof, wherein the secondary scheduling result information comprises at least one of a substrate processing time of the reconstructed equipment, a substrate processing quantity of the reconstructed equipment, a substrate yield of the reconstructed equipment, productivity of the reconstructed equipment, production efficiency of the reconstructed equipment, and combinations thereof, and wherein the optimal equipment control information comprises at least one of loadlock module supply command information, loadlock module return command information, transfer module supply command information, transfer module return command information, process module supply command information, process module return command information, and combinations thereof, which represent an optimal operation sequence to control the equipment to follow the secondary simulation model information.

* * * * *